Aug. 16, 1955 R. D. RAUB 2,715,464
CULINARY GREASE DECANTER
Filed Sept. 3, 1952
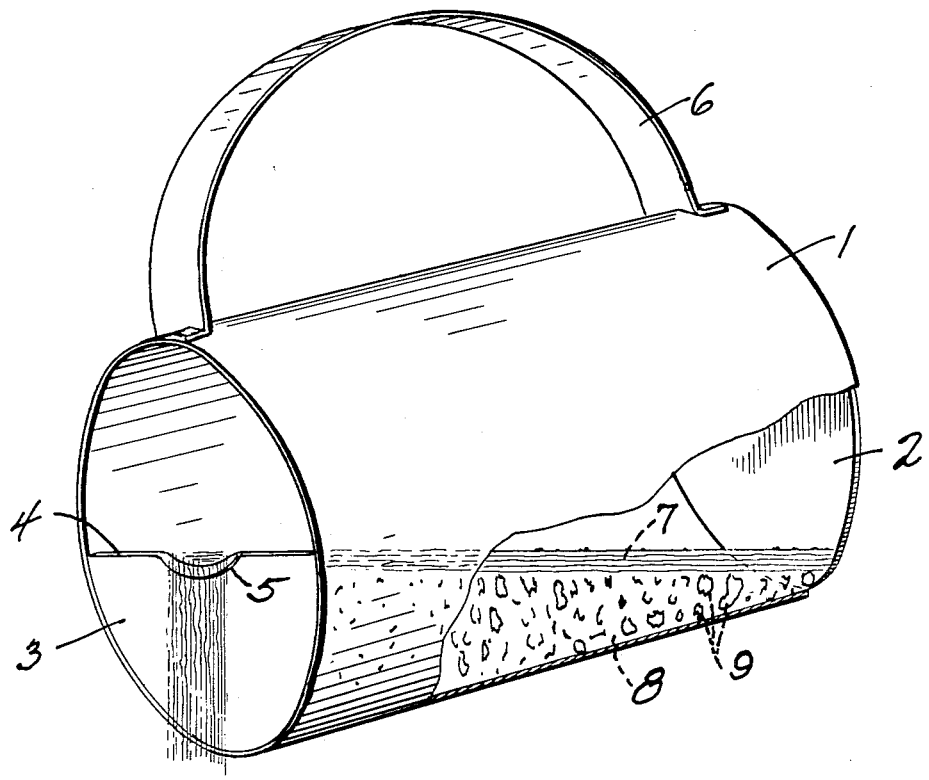
INVENTOR.
Royal D. Raub
BY Robb & Robb
Attorneys.

2,715,464

CULINARY GREASE DECANTER

Royal D. Raub, Syracuse, N. Y.

Application September 3, 1952, Serial No. 307,652

1 Claim. (Cl. 210—51)

The present invention relates to culinary utensils, and more particularly, to an improved grease decanter for removing grease and equivalent supernatent fluids which rise to the top and tend to float on a subjacent body of juices or fluids of heavier density.

While my utensil is primarily intended for domestic use in home kitchens, it is not necessarily confined to such use, since it is equally applicable to use in commercial establishments such as hotel and restaurant kitchens and the like.

It is well-known that the molten fats and greases which are present in the juices and gravy derived from roast meats and the like are less digestible and oftentimes harmful to the consumer. Nevertheless, the time and effort required to remove the grease or fatty constituents by the usual practice of skimming or ladling off the same, is so great that it is seldom done, or performed completely if at all, before serving the natural juices or before making gravy to be served.

Accordingly, it is the principal object of the present invention to provide a simple, relatively inexpensive and durable utensil which may be conveniently and easily used to effectively and quickly separate the less digestible and less palatable greases from the more digestible and more nutritious meat juices.

In attaining the aforementioned objective, I provide a receptacle of appropriate form and size, but preferably cylindrical in transverse cross-section so that it may be more readily kept clean and sanitary at all times, said receptacle being completely closed at one end, but being only partially closed at its opposite end by a barrier wall extending transversely thereacross. The barrier wall aforesaid is suitably secured at its outer edge to the extreme perimetrical end edge of the receptacle body, with the transversely extended upper free edge of the barrier wall disposed approximately diametrically across the end of the receptacle and defining a dam or weir. At or near the center of the upper linear edge of the barrier wall, the edge may be pressed or turned outwardly slightly to form a convenient pouring lip. The receptacle body is also provided with a rigid handle suitably secured thereto and preferably of bail-like form extending longitudinally of the body at one side thereof from a point near one end of the receptacle body to a point near the opposite end, to facilitate handling and manipulation of the decanter during use.

Other and further objects and advantages of the invention will be hereinafter described and the novel features thereof defined in the appended claim.

In the drawing:

The single figure represents a perspective view of a grease decanter constructed in accordance with the present invention, with a portion of the receptacle body broken away to show the typical stratification of the fluid body therein as it occurs during use of the decanter, and with the decanter shown in a forwardly tilted or inclined position as required during use thereof to pour off the supernatent grease layer over the pouring lip as indicated.

Referring to the drawing, the reference character 1 generally denotes a tubular or cylindrical body of axially elongated form, said body being completely closed at one end by an end wall 2, but being only partially closed at its opposite end by a barrier wall designated 3. The barrier wall 3 extends transversely across the partially open end of the receptacle body 1, with the outer marginal edge of the barrier wall suitably attached in fluid-tight abutting engagement with the extreme perimetrical end edge of the receptacle body, while the upper free edge 4 of the barrier wall terminates in a substantially straight line extended approximately diametrically across the end of the receptacle, thereby defining a dam or weir over which the contents of the receptacle may be poured during use of the receptacle as a decanter.

At or near the center of the upper linear edge 4 of the barrier wall 3, the edge is preferably pressed or turned outwardly slightly to form a convenient pouring lip 5.

For the purpose of permitting and facilitating convenient handling and manipulation of the receptacle during use, a handle member 6, preferably of bail-like form, is rigidly secured or otherwise anchored to the receptacle. In the drawing, the handle member 6 is shown in the form of an arched strap extended longitudinally of the receptacle body 1 at one side thereof, and having its opposite ends rigidly secured to the receptacle body 1 at or adjacent to the respective opposite ends of the latter.

It will be obvious from the foregoing that my decanter utensil may be made of any desired material such as metal, plastic, glass or the like, although the illustrated embodiment is shown as being made wholly of metal. The tubular or cylindrical shape of the receptacle body 1 may be varied, if desired, to form any other appropriate cross-sectional configuration, but I prefer that the receptacle body be of cylindrical form to minimize the number of corners or crevices from which the residue in the receptacle may be removed without difficulty during cleaning thereof, thereby contributing to ease of cleaning of the decanter so that it may more readily be kept completely sanitary at all times.

It will also be obvious that my decanter may be made of any appropriate size by varying the diameter and/or length thereof, but I prefer to make the same of such a size that it will hold a substantial quantity of fluid juices, gravy or the like from which the grease constituents are to be removed.

In the use of my decanter utensil, the juices or liquid gravy materials derived from the roast meat may be dipped from the roasting pan into the decanter if the liquid contents of the roasting pan are present in sufficient quantity and the pan is of sufficient size to permit this to be done. Otherwise, the liquid mixture may be poured from the roasting pan into the decanter receptacle. Thereafter, the liquid is preferably allowed to stand in the decanter for a brief interval, during which the grease will quickly rise or float to the top of the liquid body and form a supernatant layer thereon. In the drawing, this supernatant grease layer is designated 7, while the subjacent body of liquid is designated 8, said latter body usually containing some solid particles as indicated at 9, these solid particles being of heavier density and of relatively high nutritional value.

After stratification of the contents of the decanter, as diagrammatically represented in the drawing, the supernatant grease layer may be easily and quickly poured off by slowly and carefully tilting the receptacle body in a generally forward direction so that the grease will flow over the upper linear edge 4 of the barrier wall 3, and preferably over the pouring lip 5, as illustrated. If desired, the grease can be poured off into an appropriate receiver for the purpose of saving the same until the grease has been collected and solidified in saleable quantity. After pouring off the grease, the remainder of the contents in the decanter may be poured out into a serving dish for serving in its natural form, or it may be suitably thickened or otherwise treated to make a thickened gravy or sauce before serving.

While the specific details of my invention have been herein shown and described, the invention is not confined thereto as changes and alterations may be made without departing from the spirit thereof as defined by the appended claim.

I claim:

A grease decanter of the class described, comprising a receptacle body having a wall completely closing said receptacle body at one end and a barrier wall partially closing said receptacle body at its opposite end, said barrier wall terminating in a linear free edge extended transversely of the receptacle body from side-to-side thereof and defining a dam over which the supernatant grease may be decantered from a greasy liquid when contained in said receptacle body and the receptacle body is tilted towards its partially closed end, said free edge having a centrally located depression therein through which the grease can flow, said depression defining a relatively narrow pouring zone for confining the flow of supernatant grease therethrough to a relatively small stream, the free edge of the barrier wall being provided with an outwardly extended pouring lip along an intermediate portion thereof, and said pouring lip bordering about the depression in said free edge.

References Cited in the file of this patent

UNITED STATES PATENTS

| | | |
|---|---|---|
| 145,344 | Garnsey | Dec. 9, 1873 |
| 695,359 | Wolfe | Mar. 11, 1902 |
| 809,952 | Hoffa | Jan. 16, 1906 |
| 944,490 | Lotze | Dec. 28, 1909 |
| 1,053,023 | Frederick | Feb. 23, 1913 |
| 1,756,249 | Kaufman | Apr. 29, 1930 |
| 1,811,113 | Derby | June 23, 1931 |
| 1,870,377 | Newman | Aug. 9, 1932 |
| 1,892,539 | Regensburger | Dec. 27, 1932 |
| 2,094,869 | Ballard | Oct. 5, 1937 |
| 2,368,065 | Hyatt | Jan. 23, 1945 |